W. H. BRADY.
ADVERTISING MEMORANDUM CALENDAR.
APPLICATION FILED FEB. 24, 1916.
1,293,013.
Patented Feb. 4, 1919.
2 SHEETS—SHEET 1.
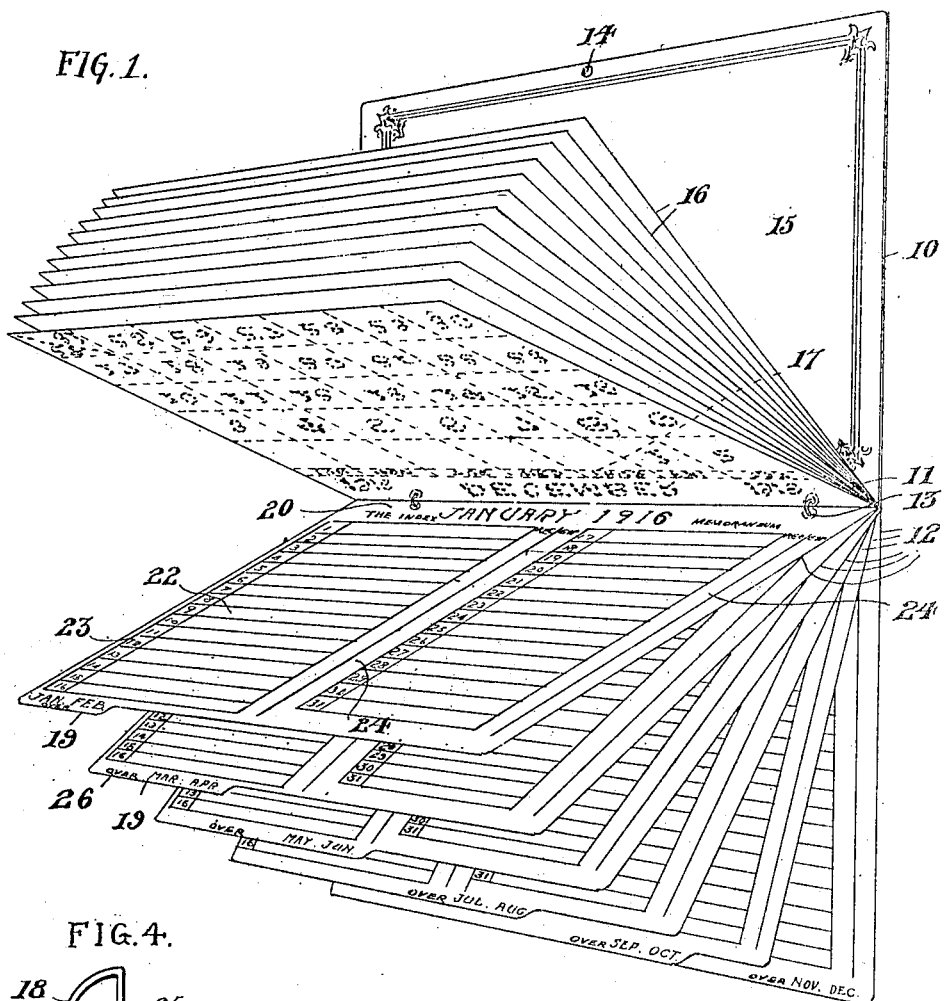
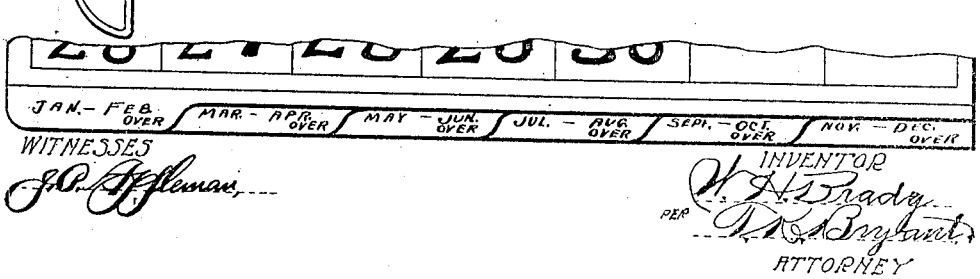

W. H. BRADY.
ADVERTISING MEMORANDUM CALENDAR.
APPLICATION FILED FEB. 24, 1916.

1,293,013.

Patented Feb. 4, 1919.
2 SHEETS—SHEET 2.

WITNESSES

INVENTOR.
ATTORNEY

UNITED STATES PATENT OFFICE.

WILLIAM H. BRADY, OF EAU CLAIRE, WISCONSIN.

ADVERTISING MEMORANDUM-CALENDAR.

1,293,013.　　　　　Specification of Letters Patent.　　Patented Feb. 4, 1919.

Application filed February 24, 1916. Serial No. 80,134.

*To all whom it may concern:*

Be it known that I, WILLIAM H. BRADY, a citizen of the United States of America, residing at Eau Claire, in the county of Eau Claire and State of Wisconsin, have invented certain new and useful Improvements in Advertising Memorandum - Calendars, of which the following is a specification.

This invention relates to new and useful improvements in advertising memorandum calendar.

The primary object of the invention is the provision of a wall calendar adapted for providing suitable indexed day and month memorandum sheets arranged for ready access in compact relations adjacent to and normally covered by the usual calendar sheets.

In arranging my form of calendar, provision is made for advertising space upon a wall card, a pad of monthly calendar sheets being hinged thereto and freely viewable, while indexed memorandum cards having receiving spaces for each day of separate months positioned upon their opposite sides and arranged in the order of the months of the year, are suspended similarly to and rearwardly of the said calendar sheets and normally hidden from view thereby, with the exception of the projecting month index portions of the said cards.

A further object of my device is to provide an advertising board to which changeable calendar pads and indexed dated memorandum cards are removably suspended for easy access and thus affording a calendar structure that is of more value to the owner than the usual calendar unprovided with such memorandum features.

With these general objects in view and others that will appear as the nature of the invention is better understood, the same consists in the novel combination and arrangements of parts hereinafter fully described, illustrated in the accompanying drawings and then claimed.

In the drawings forming a part of this application and in which like designating characters refer to corresponding parts throughout the several views:—

Figure 1 is a perspective view of the device with the calendar sheets and memorandum cards partially separated, one of the sheets showing the usual calendar features thereon in dotted lines.

Fig. 2 is a plan view of the front face or side of one of the index memorandum cards of a different year from that shown in Fig. 1 and with the days of the week added thereto.

Fig. 3 is a similar view of the rear face of such a card, and

Fig. 4 is a view of one of the suspending hinge wires.

Fig. 5 is a transverse sectional view of the device showing the calendar sheets and memorandum cards.

Especially referring to Fig. 1 of the drawings, the preferred embodiment of the invention is therein set forth illustrating both the structure and the operation of the device, it being noted that the same broadly consists of a wall card 10 having a pad 11 of calendar sheets and a set 12 of memorandum cards hinged together and thereto by means of the suspending hinge wires 13.

The wall card 10 is adapted to be suspended or hung up in a convenient position for observation and access by means of an eyelet or perforation 14 centrally positioned adjacent the upper edge thereof, the said card being arranged with a suitable space 15 upon its front face adapted for the reception of advertising matter including pictorial representations or otherwise as may be found desirable.

The calendar pad 11 consists of the usual twelve sheets 16, one being provided for each month of the year and having a complete monthly calendar thereon as illustrated by dotted lines at 17 upon the rearmost sheet 16, which sheet represents the last month of the year, December. The hinge wires 13, two in number, are freely positioned through the lower edge of the wall card 10 with their semi-circular portions 18 freely passing through the normally upper edges of each of the calendar sheets 16 forming the pad 11, it being immaterial whether the said calendar sheets are actually "padded" together or are in the form of loose sheets.

Special utility is imparted to the entire structure by the provision of the six memorandum cards 12, which are suspended from the wall card 10 by means of the hinge wires 13 in a manner similar to the suspension of the pad 11, and rearwardly thereof so that the major portion of the memorandum card set 12 lies normally concealed by the calendar pad 11, only the marginal tab portions 19 of the memorandum cards being normally viewable, projecting below the bottom of the pad 11. A separate card 12 is arranged for each of the two successive months of the year, a memorandum for a single month being arranged upon opposite faces of each card and as best illustrated in the form of the memorandum cards shown in Figs. 2 and 3 of the drawings, the tab 19 will contain abbreviations for two succeeding months such as January and February, the first named month upon such tab being found upon the front face of the cards 12 and at the tops thereof as at 20, while the memorandum for the month of February will be upon the opposite face of the said card and will read correctly when the card is elevated, the rear or reverse face then appearing as shown in Fig. 3 with the month of February indicated at the upwardly positioned portion 21 thereof.

The index memorandum for each month is arranged in two columns 22 beneath the name of the month which is at the top of the card providing designations 23 for each day of the month and an adjacently positioned line for memorandum followed by receipt and expense columns 24.

The hinge wires 13 being substantially semi-circular in form as heretofore noted have a severed straight side 25 opposite the curved side 18 thereof, the straight side being positioned at the rear side of the calendar card 10 and the memorandum cards 12. The tabs 19 projecting below the lower edges of the calendar sheets 16 when the said sheets and memorandum cards are in their normal suspended positions, it will be seen that when desired to have access to the memorandum card of any month, the requisite tab 19 may be readily engaged by the finger of the operator and the calendar pad 11 and any required ones of the cards 12 readily elevated for exposing the desired surface. A word such as "Over" is shown at 26 upon the front face of each of the tabs 19 denoting that the second month named upon that tab is upon the reverse face of the card to which the tab is attached so that access to the second month so named may be had by turning over such card.

It will thus be apparent that a unitary calendar structure is provided adaptable for circulation as an advertising medium and which possesses a high degree of value to the recipient, the calendar leaves as well as the memorandum cards being serviceable throughout the entire current year and removable and readily accessible suiting the pleasure of the owner.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

A memorandum calendar including two sets of leaves, one set constituting the commercial twelve sheet yearly calendar pad and the leaves thereof being of uniform size and each being printed with calendar information including the name of a month and numerical designations of all days of said month, and the leaves of the other set being memorandum leaves of larger size than the leaves of the first mentioned set and equal in number to $\frac{1}{2}$ the number of months in the year, the said larger leaves being each printed with the name of a month and numerical designations of all days of said month on one side and with the name of a different month and numerical designations of all days thereof on the other side, the portions of the larger leaves which project beyond the margins of the first mentioned leaves when all of the leaves are arranged in a pile being indexed and each printed with the names of both of said months whereby such names of the months on all the larger leaves are exposed to view.

In testimony whereof I affix my signature.

WILLIAM H. BRADY.

Copies of this patent may be obtained for five cents each, by addressing the "Commissioner of Patents, Washington, D. C."